(12) United States Patent
Kolor et al.

(10) Patent No.: US 9,836,423 B2
(45) Date of Patent: Dec. 5, 2017

(54) ADAPTIVE CIRCUIT BOARD ASSEMBLY AND FLEXIBLE PCI EXPRESS BUS

(71) Applicant: NetApp, Inc., Sunnyvale, CA (US)

(72) Inventors: Daniel John Kolor, Sunnyvale, CA (US); William Leo Rollins, Sunnyvale, CA (US); Robert Walker, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 512 days.

(21) Appl. No.: 14/341,456

(22) Filed: Jul. 25, 2014

(65) Prior Publication Data

US 2016/0026589 A1 Jan. 28, 2016

(51) Int. Cl.
G06F 13/40 (2006.01)
G06F 13/42 (2006.01)

(52) U.S. Cl.
CPC ...... G06F 13/4022 (2013.01); G06F 13/4221 (2013.01); *G06F 2213/0026* (2013.01)

(58) Field of Classification Search
CPC .................. G06F 13/4022; G06F 2213/0026
USPC .................................................. 710/305–317
See application file for complete search history.

(56) References Cited

U.S. PATENT DOCUMENTS

| | | | | |
|---|---|---|---|---|
| 7,711,886 B2* | 5/2010 | Foster, Sr. | ............ | G06F 13/409 710/307 |
| 8,103,810 B2* | 1/2012 | Brown | .................. | G06F 13/102 710/104 |
| 8,359,415 B2* | 1/2013 | Brown | ................ | G06F 9/45558 710/313 |
| 8,484,399 B2* | 7/2013 | Berke | ................. | G06F 13/4022 710/301 |
| 8,521,915 B2* | 8/2013 | Kishore | .............. | G06F 13/4022 710/10 |
| 8,625,615 B2* | 1/2014 | Hidaka | ............... | G06F 13/4022 370/401 |
| 9,086,919 B2* | 7/2015 | Iyer | ........................ | G06F 9/5011 |
| 9,203,699 B2* | 12/2015 | Engebretsen | ....... | H04L 41/0853 |
| 9,235,252 B2* | 1/2016 | Shrall | ................... | G06F 1/3206 |
| 9,304,799 B2* | 4/2016 | Kotta | ................... | G06F 9/45533 |
| 9,424,223 B2* | 8/2016 | Nasu | ..................... | G06F 13/409 |
| 9,459,978 B2* | 10/2016 | Fritzsche | ............ | G06F 11/2294 |
| 2013/0151750 A1* | 6/2013 | Kanigicherla | ...... | G06F 13/4022 710/313 |

(Continued)

*Primary Examiner* — Brian Misiura
(74) *Attorney, Agent, or Firm* — LeClairRyan, a Professional Corporation (57) ABSTRACT

A system and method for adaptive bus configuration operable to respond to hardware changes and other configuration changes is disclosed. In an embodiment, the computing system includes a circuit assembly having at least one processing resource coupled to a respective set of bus traces, at least one peripheral device socket coupled to a respective set of bus traces, and a bus switch coupled to the bus traces of the processing resource and the bus traces of the peripheral device. The bus switch implements a set of connections between the bus traces of the processing resource and the bus traces of the peripheral device sockets according to an instruction. The instruction may specify an allocation of peripheral device sockets to processing resources based on the number of installed processing resources so that no peripheral device is connected to a bus without an attached processor.

18 Claims, 5 Drawing Sheets

(56) References Cited

U.S. PATENT DOCUMENTS

| | | | |
|---|---|---|---|
| 2015/0254202 A1* | 9/2015 | McGlone | G06F 13/4022 710/316 |
| 2015/0324312 A1* | 11/2015 | Jacobson | G06F 13/4022 710/104 |
| 2015/0347345 A1* | 12/2015 | Hellriegel | G06F 13/409 710/301 |
| 2016/0070661 A1* | 3/2016 | Huang | G06F 13/4282 710/33 |

* cited by examiner

| | 500 ↴ | |
|---|---|---|
| | Upstream Port | Downstream Port |
| | Port A: Lane 0 | Port 0: Lane 0 |
| | Port A: Lane 1 | Port 0: Lane 1 |
| | Port A: Lane 2 | Port 1: Lane 0 |
| | Port A: Lane 3 | Port 1: Lane 1 |
| | Port A: Lane 4 | Port 1: Lane 2 |
| | Port A: Lane 5 | Port 1: Lane 3 |
| | Port A: Lane 6 | Port 2: Lane 0 |
| | ... | ... |
| | Port D: Lane 30 | Unconnected |
| | Port D: Lane 31 | Unconnected |

| | 400 ↴ | |
|---|---|---|
| 402— | Maximum Number of Buses | 2 |
| 404— | Number of Processors Installed | 2 |
| 406— | Upstream Port A | Processor A |
| | Upstream Port B | Processor B |
| | Upstream Port C | No Processor Detected |
| 408— | Root Complex A Maximum Lanes | 32 |
| | Root Complex B Maximum Lanes | 32 |
| | Root Complex C Maximum Lanes | 0 |
| 410— | Upstream Port A Maximum Lanes | 32 |
| | Upstream Port B Maximum Lanes | 32 |
| | Upstream Port C Maximum Lanes | 32 |

ADAPTIVE CIRCUIT BOARD ASSEMBLY AND FLEXIBLE PCI EXPRESS BUS

TECHNICAL FIELD

The present disclosure relates generally to computing systems and, more particularly, to a printed circuit board for use in a computing system that incorporates programmable bus switches in order to support different configurations of installed devices.

BACKGROUND

While strong demand for storage and processing has translated into steady sales of ever-more-powerful computing systems, customers have also become increasingly cost sensitive. Customers won't pay for what they don't need, and vendors have responded accordingly. As merely one example, enterprise-class storage systems are offered in a wide array of storage, processing, and networking configurations. Many customers also request systems that are upgradable over time in order to preserve some of the substantial investment. However, tension arises when customers seek customized hardware and software solutions as a cost-saving measure, in part because custom solutions are rarely cheaper to provide. Both vendors and customers carefully balance flexibility against system complexity, which tends to increase support costs and reduce system reliability.

In particular, vendors have sought opportunities to use a single component (be it a code fragment, processor, controller, storage device, etc.) in a wide array of products. This, reusability may allow the vendor to leverage economy of scale. In the simplest cases, a component can be used in a variety of situations with little or no modification. However, this is not often the case for printed circuit boards (PCBs) and other circuit assemblies. PCBs contain a large number of devices (resistors, capacitors, power circuitry, etc.) and device sockets connected by conductive traces crossing multiple insulator layers. In order to provide optimum performance, the devices and the traces are carefully laid out based on the installed components. Thus, reusability may take a backseat to reducing trace length and noise. Compounding the problem, many common protocols used to communicate at the PCB level require direct point-to-point connections rather than more flexible topologies. Accordingly, for these reasons and others, it would be beneficial for PCB designs to have the flexibility to support a wider array of hardware configurations in order to provide more cost-effective solutions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Various embodiments of the present disclosure provide a circuit assembly that can be easily reconfigured based on the installed hardware. In one example, the circuit assembly includes a number of reconfigurable Peripheral Component Interconnect Express (PCI Express) bus switches that can be programmed to connect PCI Express peripherals to one of various processors based on which of the processors are installed. Because PCI Express is a point-to-point protocol, connecting a PCI Express peripheral to an empty processor socket may leave the peripheral inaccessible. To avoid this, an exemplary PCI Express switch is programmed to connect peripherals only to those processors that are installed. Because of the switching capability, the same circuit assembly can be used with varying numbers of processors.

The connections made by the switches can also be tailored to the peripheral devices installed in the system. In one example, the switch or switches are programmed to ensure that redundant peripheral devices are not connected to common hardware such as a common bus or a common processor to avoid a single point of failure disabling all of the redundant devices. In some examples, the switches ensure that each connected peripheral device has some minimum amount of a communication resource (e.g., a minimum number of PCI Express lanes). After the minimum has been met, any leftover amount of the communication resource may be allocated according to priorities assigned to the particular peripherals. The switches may also be programmed to account for certain connections that are fixed and should not be changed. The flexibility provided by the programmable switches allows the circuit assembly to be used throughout multiple product lines without substantial changes to the underlying hardware.

Figure 1:
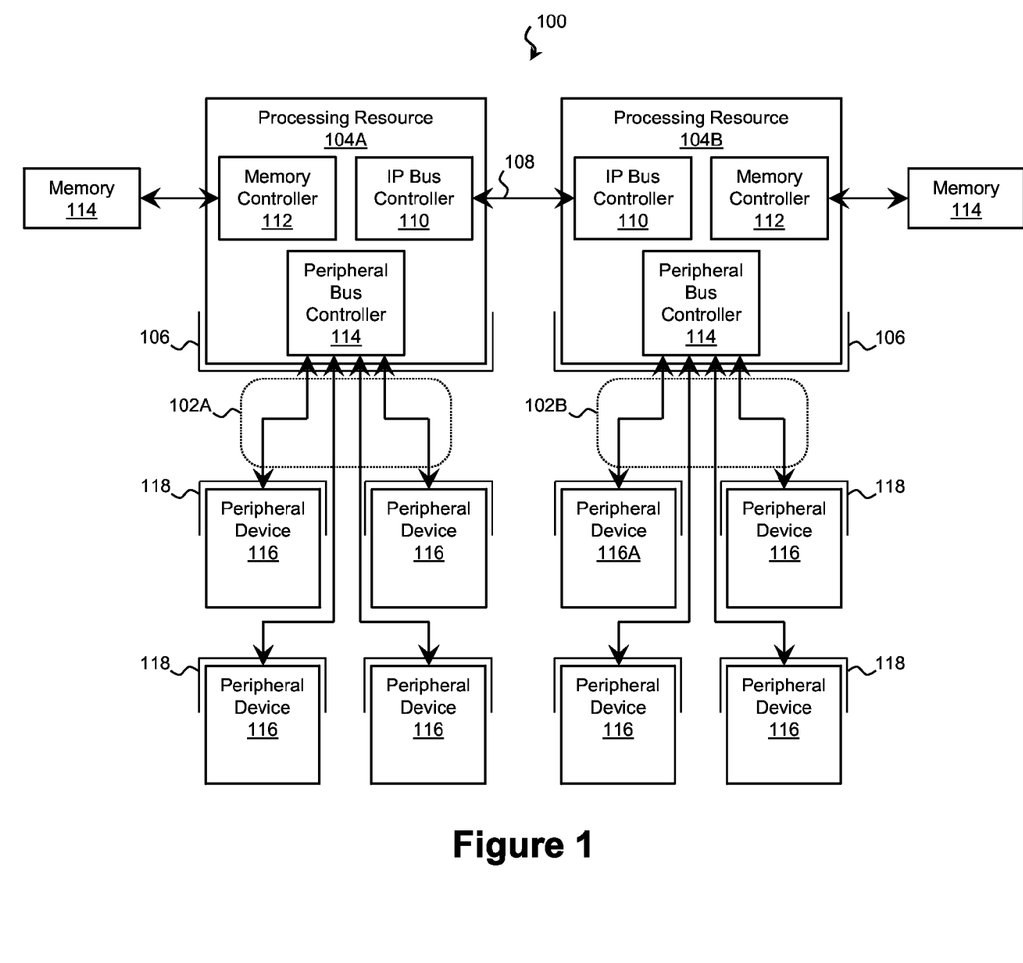
FIG. 1 is a schematic diagram of a computing system according to some embodiments of the present disclosure.

Referring first to FIG. 1, illustrated is a schematic diagram of a computing system 100 according to some embodiments of the present disclosure. In the example of FIG. 1, the computing system 100 includes a number of different computing elements in communication with each other via a set of communication buses. The communication buses may connect any number of computing elements and may conform to any suitable hardware and/or software protocol. For example in one embodiment, buses 102A and 102B are characteristic of PCI Express buses. As described in more detail below, due to the topology of these buses 102A and 102B, it is possible for some computing elements to become unreachable if other elements are not available or not installed. Thus, the computing system 100 of FIG. 1 may support only a limited number of hardware configurations.

The computing system 100 will now be described in more detail and includes one or more processing resources 104, of which two (104A and 104B) are shown. Processing resources 104A and 104B may each include one or more microcontrollers, Central Processing Units (CPUs), Application-Specific Integrated Circuits (ASICs), Programmable Logic Devices (PLDs), and/or other suitable processing resources operable to perform programmed computing instructions. In some embodiments, processing resources 104A and 104B share a single package, such as discrete cores of the same processor. In some embodiments, processing resources 104A and 104B are discrete devices. For example, processing resource 104 may be a first processor chip and processing resource 104 may be a second processor chip. In further examples, processing resources 104A and 104B each include multiple devices and may be multi-processor clusters. The processing resources 104 may be coupled to the remainder of the computing system 100 via one or more processor sockets 106. Sockets 106 include any type of slot, connector, or connector array that provides a connection between an installed component and the system 100 and may include a mechanism for easily coupling and uncoupling the installed component. The computing system 100 may include empty sockets 106 and may function without every socket 106 populated.

In the illustrated embodiment, the processing resources 104A and 104B communicate with each other via an inter-processor bus 108 such as a Quick Path Interconnect (QPI) bus from Intel Corporation, of Santa Clara, Calif. To support this bus 108, each processing resource 104 may include an inter-processor bus controller 110 operable to send and receive data transactions across the bus 108. Processing resources 104A and 104B may also include a memory controller 112 coupled to one or more pools of memory 114, such as random access memory (RAM). A pool of memory 114 may be dedicated to a particular processing resource 104 or shared between them.

In addition to the processing resources 104, the exemplary computing system 100 also includes a number of peripheral devices 116 (including peripheral device 116A) in communication with the processing resources 104. Similar to the processing resources 104, the peripheral devices 116 may be coupled to the remainder of the computing system 100 via one or more peripheral sockets 118. Sockets 118 include any type of slot, connector, or connector array that provides a connection between an installed component and the system 100 and may include a mechanism for easily coupling and uncoupling the installed component. The computing system 100 may include empty sockets 118 and may function without every socket 118 populated.

The peripheral devices 116 may include any type of computing element. For example, a peripheral device 116 may include a graphics processing unit (GPU) or other co-processor. In some examples, a peripheral device 116 includes a networking controller such as an Ethernet controller, a wireless (IEEE 802.11 or other suitable standard) controller, or any other suitable wired or wireless communication controller. In some examples, a peripheral device 116 includes a storage interface controller such as a Serial Attached SCSI (SAS), SATA, iSCSI, Fibre Channel, Fibre Channel over Ethernet (FCoE), eSATA, and/or PATA controller. In some examples, the peripheral devices 116 include peripheral controllers such as USB controllers and/or FireWire controllers. Some storage devices (e.g., solid-state drives (SSDs) and/or hard disk drives (HDDs)) connect directly to a bus and are suitable peripheral devices 116.

In the illustrated embodiment, the peripheral devices 116 are coupled to the processing resources 104A and 104B by two different buses, bus 102A and bus 102B, although the computing system 100 may include many more buses. Accordingly, processing resources 104A and 104B may each include a peripheral bus controller 114 for use in communicating with the respective bus. In embodiments where buses 102A and 102B are PCI Express buses, the respective peripheral bus controller 114 may be referred to as a root complex.

Bus 102A and bus 102B are separate and independent such that the peripheral devices 116 and processing resource 104 coupled to bus 102A do not directly communicate with those of bus 102B. In one typical example, bus 102A and bus 102B are PCI Express buses, although further embodiments incorporate other bus types. PCI Express is a serial point-to-point interconnect that connects two devices via a link. PCI Express links are asymmetrical in that an upstream device, sometimes referred to as a root device or root complex (e.g., processing resource 104A or 104B) initiates communication with a downstream device, referred to as an endpoint (e.g., peripheral devices 116). While a root complex may be coupled to multiple downstream devices, PCI Express may not support a downstream device coupled to more than one root complex. Accordingly, in the illustrated embodiment, buses 102A and 102B are separate and independent with one bus per root complex (and in turn one bus per processing resource 104). Of course, it is understood that this is only one of many examples of independent buses within a storage system 100.

Because of the separate and independent nature of the buses, if the root device (e.g., a processing resource 104) fails or is not installed, the peripheral devices 116 on the bus may be unreachable. For example, if processing resource 104B were not installed, the associated peripheral devices 116, including peripheral device 116A, may not be accessible to the remaining processing resource 104A. Thus, it would be beneficial if the connections of bus 102A and bus 102B could be changed based on the presence of the processing resource 104B so that the same components could be used in both system configurations.

Figure 2:
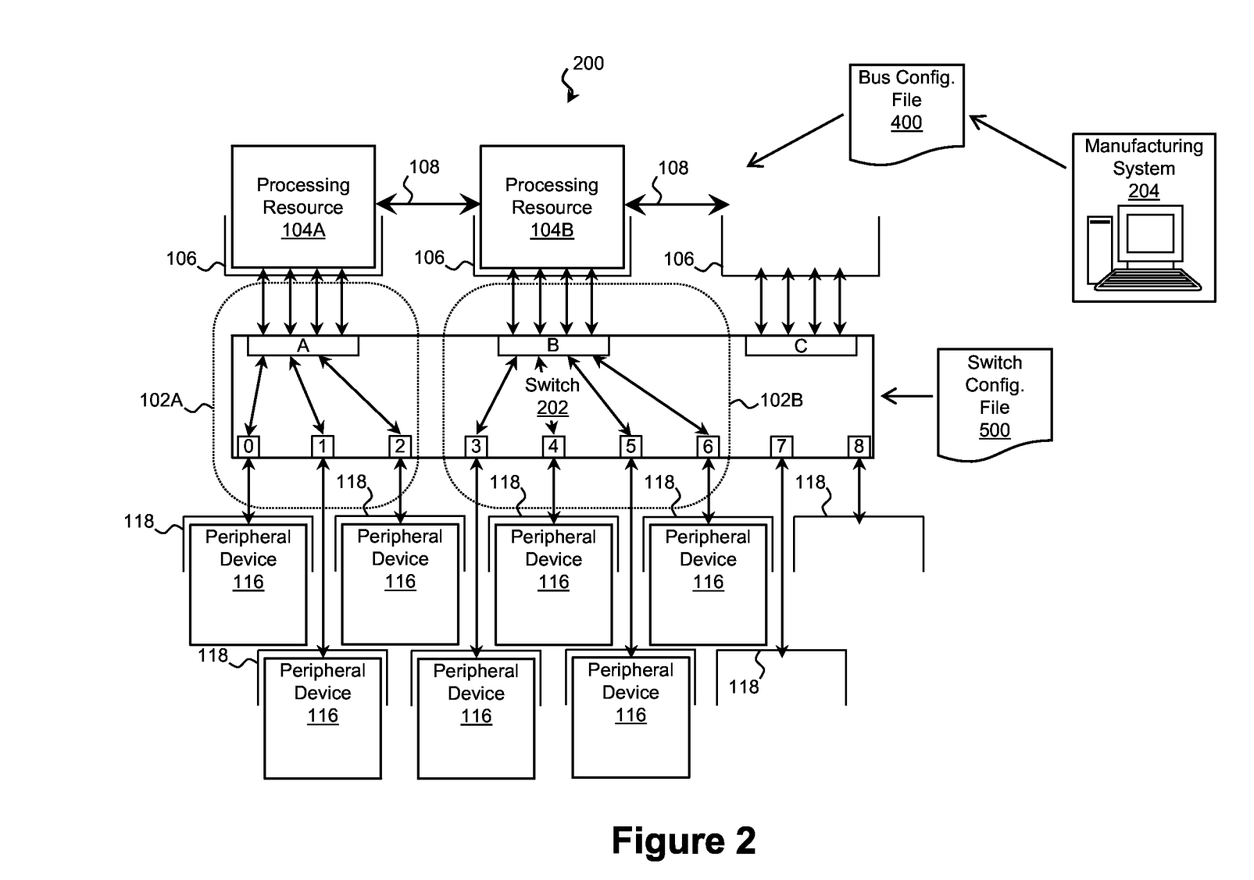
FIG. 2 is a schematic diagram of a computing system having a flexible bus architecture according to some embodiments of the present disclosure.

FIG. 2 is a schematic diagram of a computing system 200 having a flexible bus architecture according to some embodiments of the present disclosure. In many aspects, the computing system 200 includes components similar to those described in FIG. 1. For example, the computing system 200 includes processing resources 104A and 104B, sockets 106, peripheral devices 116, and peripheral sockets 118 substantially similar to those of FIG. 1.

The computing system 200 also includes one or more bus switches 202. Switch 202 is operable to connect the processing resources 104A and 104B to the peripheral devices 116 and includes upstream ports connected to the processing resources 104 and downstream ports connected to the peripheral devices 116. The number of ports has been reduced for clarity, although the switch 202 may include any combination of upstream ports and downstream ports. In some examples, switch 202 is a packet-based switch where a field of a data packet determines its destination. One advantage of packet-based switching is that many types of packet switches can route data from any source to any destination regardless of which bus or buses the devices are on. However, some communication protocols (e.g., PCI Express) do not support packet-switching, opting to trade flexibility for improved data throughput. In these cases, the switch 202 may create one or more separate and independent point-to-point buses coupling peripheral devices 116 to a processing resource 104. The assignment of a peripheral device 116 to a bus and thereby assigning it to a processing resource 104 may be carried out by programming the switch 202 to connect the various elements. The selected assignment may be based on which processing resources 104 are installed and active, which peripheral devices 116 are installed, performance considerations, peripheral device priorities, and/or other system considerations.

Figure 3:
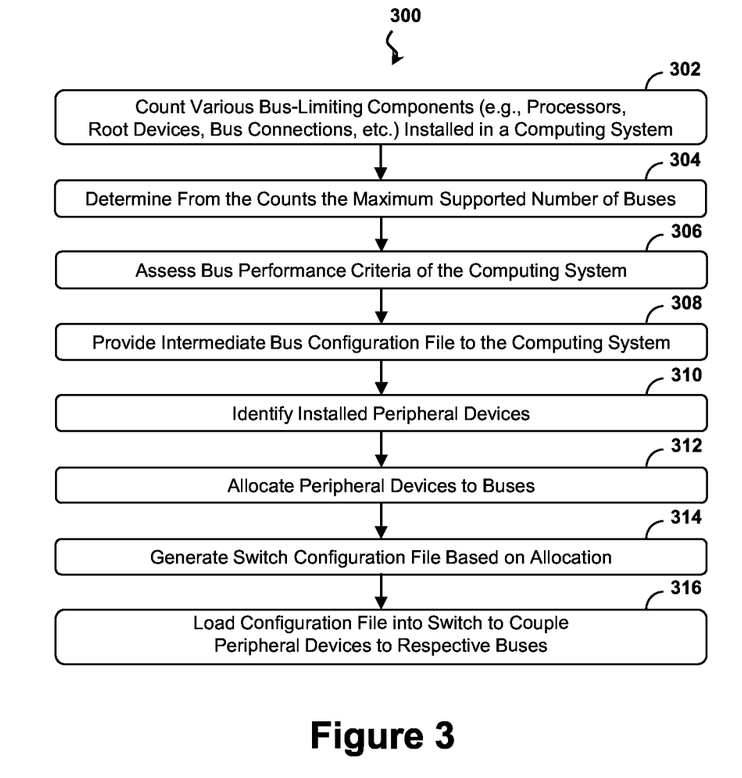
FIG. 3 is a flow diagram of a method of assigning peripheral devices to a bus according to some embodiments of the present disclosure.
Figure 4:
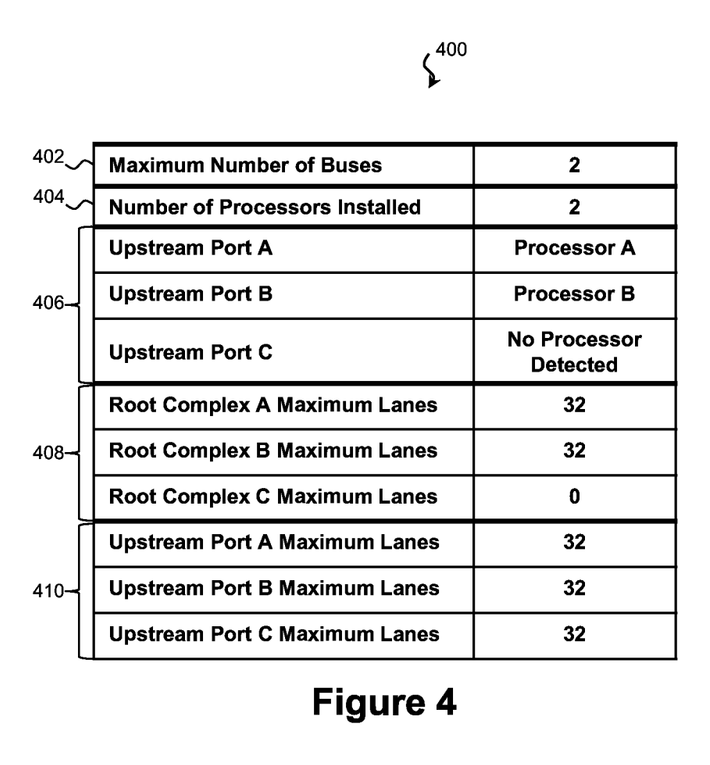
FIG. 4 is a diagram of an intermediate bus configuration file according to some embodiments of the present disclosure.
Figure 5:
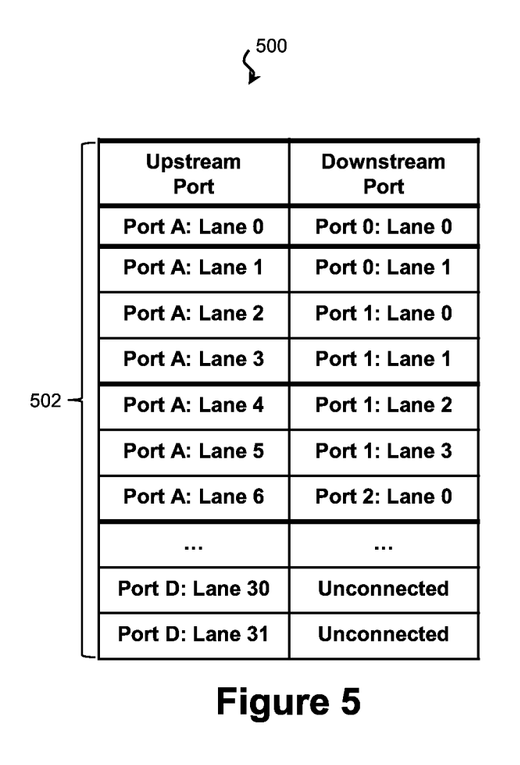
FIG. 5 is a diagram of a configuration file according to some embodiments of the present disclosure.

An example of this allocation process is described with reference to FIGS. 2-5. FIG. 3 is a flow diagram of a method 300 of assigning peripheral devices to a bus according to some embodiments of the present disclosure. It is understood that additional steps can be provided before, during, and after the steps of method 300, and that some of the steps described can be replaced or eliminated for other embodiments of the method 300. FIG. 4 is a diagram of an intermediate bus configuration file 400 according to some embodiments of the present disclosure. FIG. 5 is a diagram of a configuration file 500 according to some embodiments of the present disclosure.

Referring to block 302 of FIG. 3 and to FIG. 2, the numbers of various bus-limiting devices installed and active in the computing system 200 are determined. Bus-limiting devices may include processing resources 104, peripheral devices 116, bus wires, switch 202 ports, and/or other communication elements. For example, in PCI Express-based embodiment, each root complex is a bus-limiting device because each bus may have one and only one root complex. In the embodiments of FIG. 2, the root complexes are integrated into the processing resources 104A and 104B. Accordingly, in these examples, determining how many bus-limiting devices are installed includes determining how many processing resources 104 are installed. In one such example, the computing system 200 may poll the processor sockets 106 to determine how many processing resources 104 are installed and which sockets 118 they are installed in. Additionally or in the alternative, other components, such as the switch 202, are bus-limiting devices. For example, a switch 202 may have a limited number of upstream ports (three in the example of FIG. 2), which may define a limit on the number of buses that may be created.

The computing system 200 may determine for itself how many bus-limiting devices are installed. However, there are also advantages to assessing the installed bus-limiting devices before the computing system 200 is operational or even before the system 200 is fully assembled. Thus, in various embodiments, the determination is made in part by a computing system other than computing system 200, such as a manufacturing system 204 used in the design and/or assembly of the computing system 200. Employing a separate system such as the manufacturing system 204 may avoid the need to add components to the computing system 200 to support a partial boot of the system 200. Similarly, in some embodiments, the determination is made in part by a technician. This may be useful when components (e.g., the switch 202) cannot be polled electronically.

Referring to block 304 of FIG. 3 and to FIG. 2, a maximum number of buses is determined based on how many bus-limiting devices are installed in the computing system 200. In the embodiments of FIG. 2, the determining entity (one or more of the computing system 200, the manufacturing system 204, and/or the technician) recognizes that two installed processing resources 104A and 104B allow for, at most, two PCI Express buses even though the switch 202 and the processor sockets 106 support up to three. In another exemplary embodiment, the determining entity determines that a system 200 with a single root complex will only support a single PCI Express bus.

Referring to block 306 of FIG. 3, various bus performance criteria of the computing system 200 are assessed. The assessment may be performed by the computing system 200, by another system such as the manufacturing system 204, and/or by a technician and may include identifying the possible communication links available between devices as well as performance metrics such as bandwidth, latency, and/or overhead. For example, PCI Express devices typically communicate using sets of parallel conductors referred to as lanes. Each lane may transmit one bit per cycle. By connecting multiple lanes in parallel between two devices, multiple bits per cycle may be transmitted. Common configurations include x1, x2, x4, x12, x16, and x32 connections. The maximum attainable bandwidth between any two devices may be limited if there are not enough conductors running between the devices. For example, two x16 devices connected via an x8 bus may not operate at their full potential. Accordingly, to determine the maximum performance attainable from a bus, attributes (e.g., protocol, bandwidth, communication medium, number of conductors, etc.) of the processing resources 104, of the processor sockets 106, of the device sockets 118, of the switch 202, of the connections between these elements, and/or any other attribute of the computing system 200 may be considered. Other relevant performance criteria may include the communication medium and the communication protocol because, while a bus may utilize any suitable communication medium and any suitable communication protocol, the particular choice of medium and protocol may dramatically affect how the computing system 200 should be configured in order to maximize performance.

Referring to block 308 of FIG. 3 and to FIG. 4, an intermediate bus configuration file 400 may be provided to the computing system 200. As discussed above, the determinations of blocks 302-306 may be made by the computing system 200, another computing system, and/or a technician. Subsequent determinations based on installed peripheral devices 116 may also be made by the computing system 200, another computing system, and/or a technician. For a variety of reasons, in some embodiments, it is advantageous for an entity other than computing system 200 to determine the number of installed bus-limiting devices, to determine the maximum number of buses, and to assess the bus performance attributes. For example, the bus-limiting devices and the bus architecture may change infrequently compared to the peripheral devices 116, which may be added and removed far more often. Furthermore, some of the bus-limiting devices such as the switch 202 may not support polling and thus may be difficult to assess by the computing system 200 itself. In addition, because processing resources are often used earlier in the boot sequence than the peripheral devices 116, configuring the computing system 200 to detect these elements may entail more modifications to the system 200. To alleviate these issues, some or all of blocks 302-306 may be performed by another entity. The other entity can provide information in the form of the intermediate bus configuration file 400 to the computing system 200 to simplify the bus configuration tasks performed by the system 200 itself.

An exemplary intermediate bus configuration file 400 is shown in FIG. 4. The exemplary intermediate bus configuration file 400 contains information determined in one or more of blocks 302-306. In one example, the intermediate bus configuration file 400 contains an entry 402 representing the maximum number of buses supported in the current system 200 configuration. In a further example, the intermediate bus configuration file 400 contains an entry 404 representing the number of processing resources 104 installed in the computing system 200 and may correlate the processing resources 104 to the processor sockets 106 in which they are installed. Additionally or in the alternative, the intermediate bus configuration file 400 may contain an entry 406 correlating the installed processing resources 104 to the ports of a switch 202 (e.g., PCI Express upstream ports) to which they are connected. Some entries of the intermediate bus configuration file 400 may also record a communication performance attribute of an element of the computing system 200. For example, entries 408 record the number of PCI Express lanes supported by various elements of the computing system 200. Exemplary entries 410 record the number of PCI Express lanes available for particular ports of a switch 202. Of course, these examples are not intended to be limiting, and the intermediate bus configuration file 400 may include any combination of these and other suitable entries. The intermediate bus configuration file 400 be represented in any suitable format, and in various embodiments is represented as a linked list, a tree, a table such as a hash table, an associative array, a state table, a flat file, a relational database, and/or other memory structure.

Referring to block 310 of FIG. 3 and referring back to FIG. 2, the peripheral devices 116 installed in the computing system 200 are identified. The identification may be performed by the computing system 200, by another computing system, and/or by a technician. In some embodiments, this includes identifying the type of peripheral device 116 installed (e.g., graphics processing unit, co-processor, networking controller, peripheral controller, storage interface controller, storage device, etc.). In some embodiments, this includes identifying a minimum, average, expected, and/or peak performance metric of the peripheral device 116. For example, in one such embodiment, the maximum number of PCI Express lanes supported by a peripheral device 116 is identified. In some embodiments, identifying the peripheral devices 116 includes identifying those peripheral devices 116 designated to operate in parallel as redundant devices such as redundant storage controllers. In some embodiments, identifying the peripheral devices 116 includes identifying unpopulated peripheral sockets 118 so that bus resources are not wasted on an empty socket.

Referring to block 312 of FIG. 3, an allocation of peripheral devices 116 to buses is determined. Any of the system aspects determined in blocks 302-310 may be considered in determining the allocation. To do so, the determining entity (e.g., the computing system 200, another computing system such as the manufacturing system 204, and/or a technician) may consider any analysis performed by the entity, analysis performed by other entities such as that recorded in the intermediate bus configuration file 400, and/or any other configuration or performance data. The determination may also consider various rules such as priority rules and/or minimum specified resource rules governing the peripheral devices 116.

Various exemplary embodiments will now be described. While any of the considerations described in the various exemplary embodiments may be combined with any other considerations, in the interest of brevity, only a limited number of combinations will be described. In one exemplary embodiment, the allocation is determined so that each peripheral device 116 is connected to at least one processing resource 104 by at least one bus. In one exemplary embodiment, the allocation is determined so that each peripheral device 116 is connected to only one processing resource 104 by only one bus. In one exemplary embodiment, the allocation is determined so that peripheral devices 116 of similar types are divided equally between the processing resources 104. In one exemplary embodiment, the allocation is determined so that redundant peripheral devices 116 are not assigned to a common bus, switch 202, and/or processing resource 104. In one exemplary embodiment, the allocation is determined so that each processing resource 104 is coupled to at least one peripheral device 116 of a given type (e.g., GPUs, storage controllers, storage devices, etc.). In one exemplary embodiment, the allocation is determined so that each peripheral device 116 is allocated at least a minimum amount of an available communication resource (e.g., at least a x1 link, at least a x2 link, at least a x4 link, etc.). In one exemplary embodiment, the allocation is determined so that high priority peripheral devices 116 (e.g., GPUs, storage controllers, storage devices, etc.) are allocated the remainder of an available communication resource after a minimum has been satisfied among the peripheral devices 116. In one exemplary embodiment, the allocation is determined so that a particular peripheral device 116 is the only peripheral device 116 coupled to a particular bus. In one exemplary embodiment, the allocation is determined to account for certain connections, buses, and/or links that are fixed and cannot be changed. In one exemplary embodiment, the allocation is determined so that communication resources are directed away peripheral sockets 118 that do not have an attached peripheral device 116 and redistributed to populated sockets 118.

Referring to block 314 of FIG. 3 and to FIG. 5, a configuration file 500 is created based on the allocation of peripheral devices 116 to buses. The configuration file 500 may be created by the computing system 200 or provided to the computing system by another entity. The configuration file 500 includes an instruction for one or more switches 202 of the computing system 200 to implement the determined allocation of peripheral devices 116 to buses and processing resources 104. As described above, the switches 202 are programmable to implement various bus configurations, and the particular bus configuration is selected by the configuration file 500.

FIG. 5 illustrates an exemplary configuration file 500, although it is understood that the configuration file 500 may take any other suitable form and may be represented in any suitable format including an FPGA (Field Programmable Gate Array) table, a PLD (Programmable Logic Device) configuration file, a table such as a hash table, an associative array, a state table, a linked list, a tree, a flat file, a relational database, and/or other memory structure. In an embodiment, the configuration file 500 for a 4-way x32 switch 202 includes 32 entries 502 for each upstream port. Each entry 502 correlates a link of the upstream port to a link of a downstream port based on the allocation of block 314. Referring to block 316, when the configuration file 500 is loaded into the switch 202, the upstream ports are connected to the downstream ports based on the entries 502 of the configuration file 500 to form the specified bus connections. In this way, the communication buses of the computing system 200 can be configured based on the installed elements.

Figure 6:
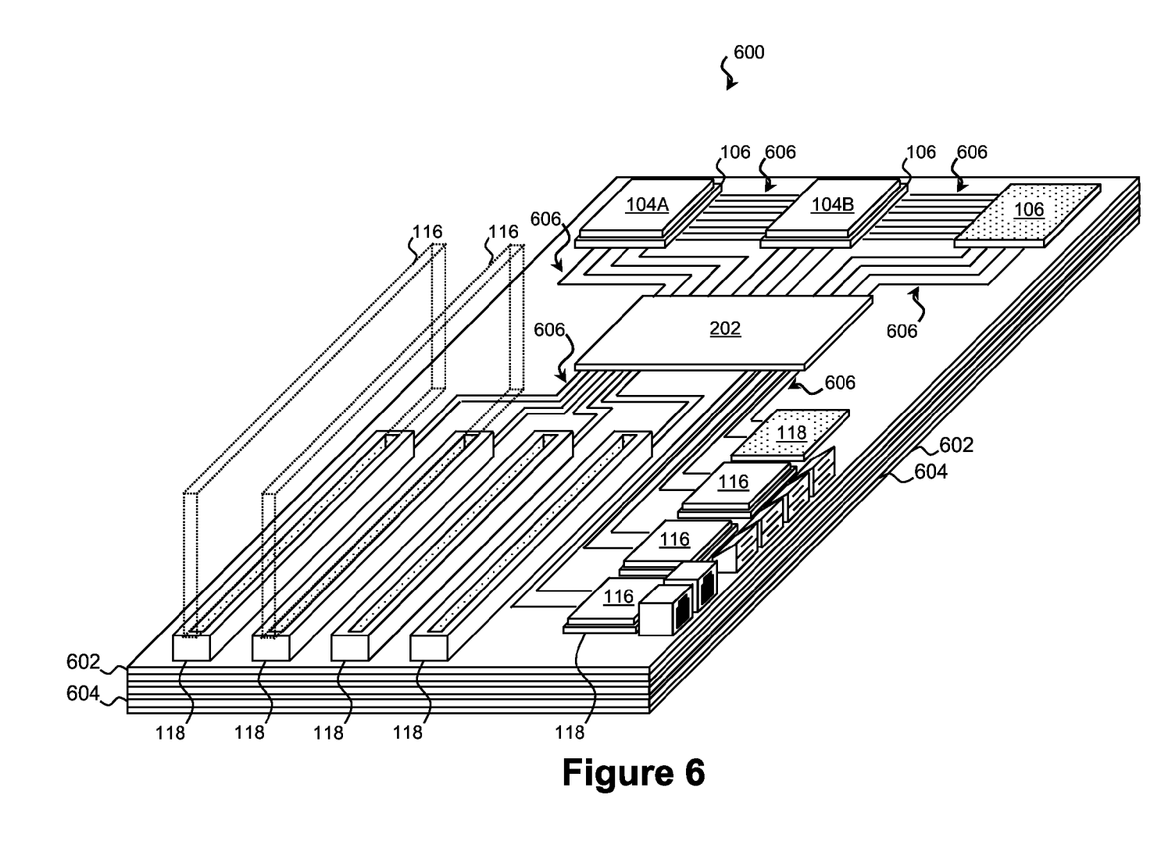
FIG. 6 is a perspective view of a portion of computing system having a flexible bus architecture in an assembled form according to some embodiments of the present disclosure.

An exemplary implementation of the computing system 200 will now be described. Whereas FIG. 2 is a schematic diagram of the computing system 200, FIG. 6 is a perspective view of a portion of the computing system 200 in an assembled form according to some embodiments of the present disclosure. FIG. 6 shows the computing elements arranged on a circuit board assembly 600, such as a motherboard, a daughter board, an expansion card, and/or another circuit assembly. The circuit board assembly 600 physically supports the elements and provides communicative connections between them. In many embodiments, the circuit board assembly 600 is made up of a number of alternating insulating and conductive layers. The insulating layers 602 provide rigidity and durability and typically contain an insulating material combined with an epoxy to create a laminate sheet. Typical materials include glass-reinforced epoxy laminate. The conductive layers 604 contain conductive traces 606 that connect the various elements disposed on the circuit board assembly 600. Based on the application, conductive traces 606 may include any conductive material including copper, tin, silver, gold, other metals or metal alloys, and/or non-metallic conductors. The conductive traces 606 may be formed on or bonded to the insulating layers 602 or may be formed on a backing material. Conductive traces 606 on different conductive layers may entail creating openings in the insulating layers 602. The openings are filled with vertical conductive segments to create via structures between the traces 606 of the different conductive layers.

The circuit board assembly 600 includes one or more processing resources 104 (e.g., processing resources 104A and 104B) coupled to the circuit board assembly 600. In some embodiments, the processing resources 104 are inserted into a processor socket 106 that is soldered or otherwise affixed to the circuit board assembly 600. In alternate embodiments, the processing resources are soldered or otherwise affixed to the circuit board assembly 600 directly. The circuit board assembly 600 may also include memory and/or memory sockets disposed thereupon and may include traces 606 coupling the memory to one or more of the processing resources.

Circuit board assembly 600 may also include one or more peripheral devices 116 and/or peripheral sockets 118 for coupling peripheral devices 116. Referring to FIG. 6, some peripheral devices 116 are represented by translucent shapes to avoid hiding other elements. Exemplary peripheral devices 116 may include but are not limited to graphics processing units, co-processors, networking controllers, peripheral controllers, storage interface controllers, and/or storage devices. In order to communicatively couple the peripheral devices 116 to the processing resources 104, the circuit board assembly 600 may include conductive traces 606 forming one or more communication buses. In more detail, the conductive traces 606 may connect the peripheral devices 116 and the processing resources to one or more switches 202. In turn, the switches 202 determine how the peripheral devices 116 map to the processing resources 104. In some embodiments, the circuit board assembly 600 includes conductive traces 606 coupled to a command interface or other programming port of a switch 202 over which the switch 202 may be programmed as described in the context of FIGS. 2-5.

Embodiments of the present disclosure can take the form of a computer program product accessible from a tangible computer-usable or computer-readable medium providing program code for use by or in connection with a computer or any instruction execution system. For the purposes of this description, a tangible computer-usable or computer-readable medium can be any apparatus that can store the program for use by or in connection with the instruction execution system, apparatus, or device. The medium can be an electronic, magnetic, optical, electromagnetic, infrared, or a semiconductor system (or apparatus or device). In some embodiments, one or more processors 110 of the storage system 102 execute code to implement the actions described above.

Accordingly, a system and method for adaptive bus configuration that accounts for installed hardware is provided. In some exemplary embodiments, the computing system comprises a circuit assembly having coupled to and disposed thereupon: at least one processing resource, at least one peripheral device socket, and a bus switch. Each of the at least one processing resource is coupled to a respective set of bus traces, and each of the at least one peripheral device socket is coupled to a respective set of bus traces. Accordingly, the bus switch is coupled to each set of bus traces of the at least one processing resource and to each set of bus traces of the at least one peripheral device socket. The bus switch is operable to receive an instruction and, based on the instruction, to implement a set of connections between each set of bus traces of the at least one processing resource and each set of bus traces of the at least one peripheral device socket. In one such embodiment, the bus switch is operable to communicatively couple the at least one peripheral device socket to the at least one processing resource such that each peripheral device of the computing system is communication with at least one of the at least one processing resource. In one such embodiment, the computing system further includes at least one root complex associated with the at least one processing resource and the bus switch includes a Peripheral Component Interconnect Express (PCI Express) bus switch. The bus switch is operable to communicatively couple the at least one peripheral device socket to the at least one processing resource such that each peripheral device of the computing system is coupled to at least one of the at least one root complex via a PCI Express bus.

In further exemplary embodiments, the method of configuring a computing system includes determining a count of installed processing resources of the computing system. Based on the count of installed processing resources, a configuration file is generated that specifies a device assignment of a peripheral device of the computing system to a bus of the computing system associated with an installed processing resource. The configuration file is provided to a switch in communication with the peripheral device and the bus. The configuration file configures the switch to implement the device assignment and to communicatively couple the peripheral device to the installed processing resource via the bus. In one such embodiment, the generating of the configuration file includes, based on the count of installed processing resources, determining the device assignment such that each peripheral device of the computing system is coupled to at least one of the installed processing resources. In one such embodiment, the generating of the configuration file also includes determining the device assignment such that each peripheral device of the computing system is allocated a minimum communication resource.

In yet further exemplary embodiments, the apparatus comprises a non-transitory, tangible computer readable storage medium storing a computer program, wherein the computer program has instructions. When executed by a computer processor, the instructions carry out: determining a processor count of a computing system having one or more installed processors; allocating a set of peripheral device sockets to the one or more installed processors based on the determined processor count such that each socket of the set of peripheral device sockets is communicatively coupled to at least one of the one or more installed processors; generating a switch instruction for implementing the allocation; and providing the switch instruction to a switch of the computing system and thereby coupling the set of peripheral device sockets to the one or more installed processors. In some such embodiments, the apparatus comprises further instructions that carry out allocating the set of peripheral device sockets further based on a peripheral device priority.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A non-transitory machine readable medium having stored thereon instructions for performing a method comprising machine executable code which when executed by at least one machine, causes the machine to:
    determine a first number of one or more installed processors of a computing device by polling one or more processor sockets of the one or more installed processors and identify a set of peripheral device sockets associated with the one or more installed processors;
    identify a maximum number of buses supported by the computing device based on the determined first number of the one or more installed processors;
    determine one or more bus performance attributes of the computing device based on the identified maximum number of buses;
    allocate a set of peripheral device sockets of one or more peripheral devices to the one or more installed processors based on the determined one or more bus performance attributes such that each socket of the set of peripheral device sockets of the one or more peripheral devices is communicatively coupled to at least one of the one or more installed processors and each of the one or more peripheral devices is allocated at least a minimum amount of an available communication resource;
    generate a switch instruction for implementing the allocation; and
    provide the switch instruction to a switch of the computing system for coupling the set of peripheral device sockets of the one or more peripheral devices to the one or more installed processors according to the allocation.

2. The non-transitory machine readable medium as set forth in claim 1, wherein the machine executable code which when executed by at least one machine, causes the machine to:
    identify one or more peripheral device types of the same type for one or more peripheral devices installed in the computing system; and
    allocate the set of peripheral device sockets of the one or more peripheral devices equally further based on the one or more peripheral devices to be identified as having the same device type, wherein the one or more peripheral device types comprises graphics processing unit, networking controller, peripheral controller or storage interface controller and wherein the one or more bus performance attributes comprises bandwidth, latency, communication medium, number of conductors or overhead.

3. The non-transitory machine readable medium as set forth in claim 1, and wherein the machine executable code which when executed by at least one machine, causes the machine to:
    generate a configuration file based on the first number of one or more installed processors, wherein the configuration file includes the switch instruction for implementing the allocation.

4. The non-transitory machine readable medium as set forth in claim 3, and wherein the machine executable code which when executed by at least one machine, causes the machine to:
    provide the configuration file to the switch of the computing system and coupling the set of peripheral device sockets of the one or more peripheral devices to the one or more installed processors according to the allocation.

5. The non-transitory machine readable medium as set forth in claim 1, and wherein the machine executable code which when executed by at least one machine, causes the machine to: provide the switch instruction to the switch for coupling the set of peripheral device sockets of the one or more peripheral devices to the one or more installed processors further based on an amount of the available communication resources remaining after allocating the minimum amount of the available communication resources.

6. The non-transitory machine readable medium as set forth in claim 1, and wherein the machine executable code which when executed by at least one machine, causes the machine to:
    provide the switch instruction to the switch for coupling the set of peripheral device sockets of the one or more peripheral devices to the one or more installed processors further based on a minimum number of PCI Express lanes.

7. A method comprising:
    determining, by a computing device, a first number of one or more installed processors of the computing device by polling one or more processor sockets of the one or more installed processors and identifying a set of peripheral device sockets associated with the one or more installed processors;
    identifying, by the computing device, a maximum number of buses supported by the computing device based on the determined first number of the one or more installed processors;
    determining, by the computing device, one or more bus performance attributes of the computing device based on the identified maximum number of buses;
    allocating, by the computing device, a set of peripheral device sockets of one or more peripheral devices to the one or more installed processors based on the determined one or more bus performance attributes such that each socket of the set of peripheral device sockets of the one or more peripheral devices is communicatively coupled to at least one of the one or more installed processors and each of the one or more peripheral devices is allocated at least a minimum amount of an available communication resource;
    generating, by the computing device, a switch instruction for implementing the allocation; and
    providing, by the computing device, the switch instruction to a switch of the computing system for coupling the set of peripheral device sockets of the one or more peripheral devices to the one or more installed processors according to the allocation.

8. The method of claim 7, wherein allocating the set of peripheral device sockets of the one or more peripheral devices further includes:
   identifying one or more peripheral device types of the same type for one or more peripheral devices installed in the computing system; and
   allocating based on the one or more peripheral devices to be identified as having the same device type, wherein the one or more peripheral device types comprises graphics processing unit, networking controller, peripheral controller or storage interface controller and wherein the one or more bus performance attributes comprises bandwidth, latency, communication medium, number of conductors or overhead.

9. The method of claim 7, wherein allocating the set of peripheral device sockets of the one or more peripheral devices further includes: providing the switch instruction to the switch for coupling the set of peripheral device sockets of the one or more peripheral devices to the one or more installed processors further based on an amount of the available communication resources remaining after allocating the minimum amount of the available communication resources.

10. The method of claim 7, wherein allocating the set of peripheral device sockets of the one or more peripheral devices further includes: provide the switch instruction to the switch for coupling the set of peripheral device sockets of the one or more peripheral devices to the one or more installed processors further based on a minimum number of PCI Express lanes.

11. The method of claim 7, generating a configuration files based on the first number of one or more installed processors, wherein the configuration file includes the switch instruction for implementing the allocation.

12. The method of claim 11, providing the configuration file to the switch of the computing system and coupling the set of peripheral device sockets of the one or more peripheral devices to the one or more installed processors according to the allocation.

13. A computing device comprising:
   a memory containing a machine readable medium comprising machine executable code having stored thereon instructions for performing a method of providing a configuration file that configures a switch to implement device allocation; and
   a processor coupled to the memory, the processor configured to execute the machine executable code to cause the processor to:
   determine a first number of one or more installed processors of a computing device by polling one or more processor sockets of the one or more installed processors and identify a set of peripheral device sockets associated with the one or more installed processors;
   identify a maximum number of buses supported by the computing device based on the determined first number of the one or more installed processors;
   determine one or more bus performance attributes of the computing device based on the identified maximum number of buses;
   allocate a set of peripheral device sockets of one or more peripheral devices to the one or more installed processors based on the determined one or more bus performance attributes such that each socket of the set of peripheral device sockets of the one or more peripheral devices is communicatively coupled to at least one of the one or more installed processors and each of the one or more peripheral devices is allocated at least a minimum amount of an available communication resource;
   generate a switch instruction for implementing the allocation; and
   provide the switch instruction to a switch of the computing system for coupling the set of peripheral device sockets of the one or more peripheral devices to the one or more installed processors according to the allocation.

14. The device of claim 13, wherein the processor is further configured to execute the machine executable code to cause the processor to:
   identify one or more peripheral device types of the same type for one or more peripheral devices installed in the computing system; and
   allocate the set of peripheral device sockets of the one or more peripheral devices equally further based on the one or more peripheral devices to be identified as having the same device type, wherein the one or more peripheral device types comprises graphics processing unit, networking controller, peripheral controller or storage interface controller and wherein the one or more bus performance attributes comprises bandwidth, latency, communication medium, number of conductors or overhead.

15. The device of claim 13, wherein the processor is further configured to execute the machine executable code to cause the processor to: provide the switch instruction to the switch for coupling the set of peripheral device sockets of the one or more peripheral devices to the one or more installed processors further based on an amount of the available communication resources remaining after allocating the minimum amount of the available communication resources.

16. The device of claim 13, wherein the processor is further configured to execute the machine executable code to cause the processor to: provide the switch instruction to the switch for coupling the set of peripheral device sockets of the one or more peripheral devices to the one or more installed processors further based on a minimum number of PCI Express lanes.

17. The device of claim 13, wherein the processor is further configured to execute the machine executable code to cause the processor to: generate a configuration file based on the first number of one or more installed processors, wherein the configuration file includes the switch instruction for implementing the allocation.

18. The device of claim 17, wherein the processor is further configured to execute the machine executable code to cause the processor to: provide the configuration file to the switch of the computing system and coupling the set of peripheral device sockets of the one or more peripheral devices to the one or more installed processors according to the allocation.

* * * * *